United States Patent Office 3,563,699
Patented Feb. 16, 1971

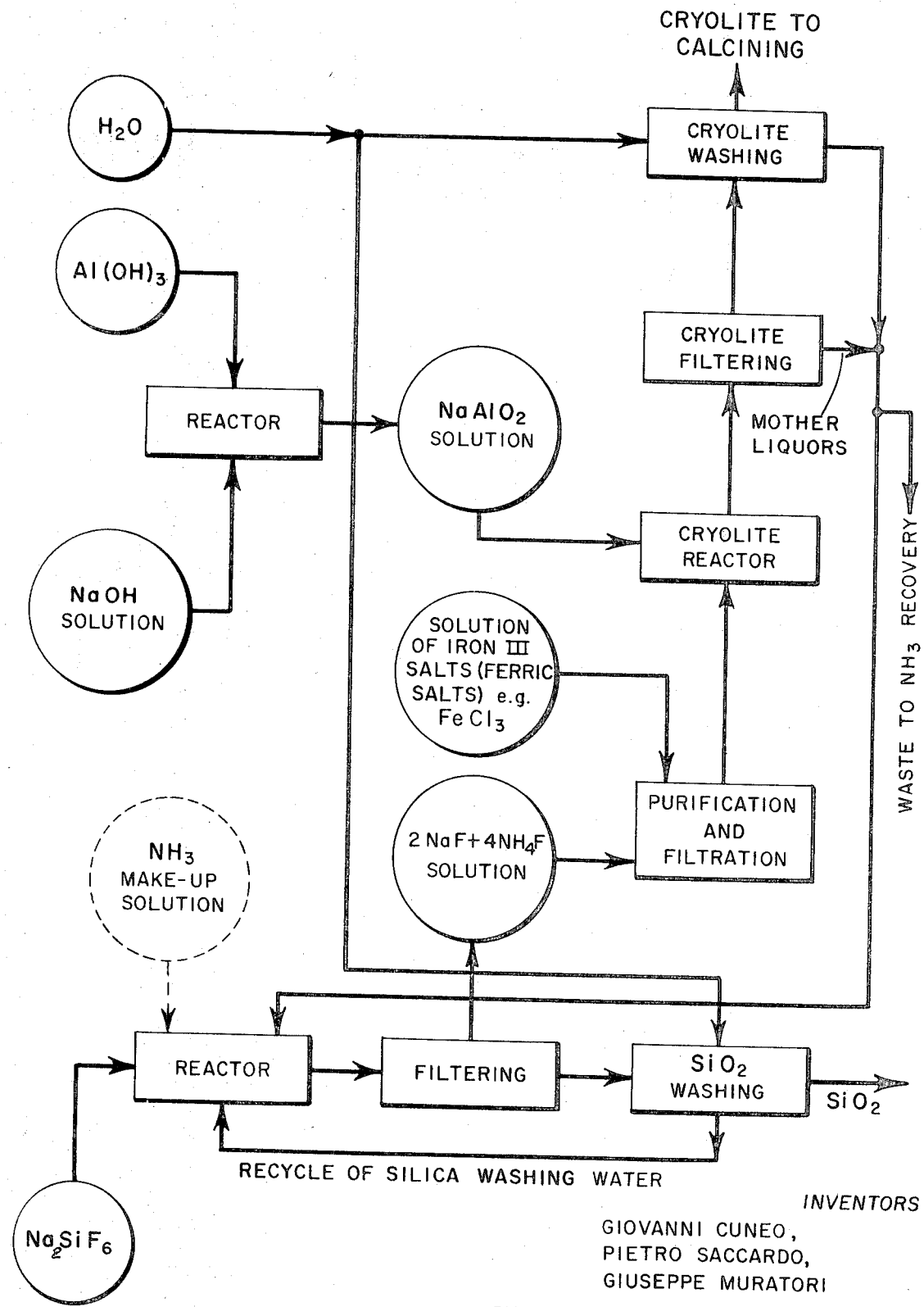

3,563,699
PROCESS FOR THE PREPARATION OF VERY PURE CRYOLITE FROM SODIUM FLUOSILICATE AND AMMONIA
Giovanni Cuneo and Pietro Saccardo, Milan, and Giuseppe Muratori, Villanova di Bagnacavallo, Italy, assignors to Montecatini Edison S.p.A., Milan, Italy, a corporation of Italy
Filed May 28, 1969, Ser. No. 828,570
Int. Cl. C01c *1/02;* C01f *7/54*
U.S. Cl. 23—88          7 Claims

ABSTRACT OF THE DISCLOSURE

A process for the preparation of cryolite starting from sodium fluosilicate is disclosed which involves the steps of:

(a) reaction, at temperature between 35° C. and 80° C., of sodium fluosilicate with a dilute aqueous solution of ammonia, said ammonia being in excess of 20–30% by weight on the stoichiometric quantities necessary to satisfy the reaction:

$Na_2SiF_6 + 4NH_4OH \rightarrow 2NaF + 4NH_4F + SiO_2 + 2H_2O$ so that the final pH is between 7.9 and 9.2; thus obtaining an aqueous solution of sodium and ammonium fluorides and a precipitate of silica.
(b) separation of silica.
(c) treatment of the solution of sodium and ammonium fluorides with a ferric salt in excess with respect to the silica and phosphate ion still contained in the solution, and separating the precipitated impurities.
(d) incomplete precipitation of the cryolite obtainable from the above solution by adding sodium meta-aluminate in an amount less than the stoichiometric quantity necessary to precipitate all the cryolite, so that a substantial quantity of fluoride ion remains in the solution.
(e) recycling of all or part of the mother liquor of the cryolite for reaction with sodium fluosilicate.

The present invention relates to a process for the preparation of artificial cryolite $Na_3AlF_6$ (aluminum and sodium fluorides double salt, $AlF_3 \cdot 3NaF$) by the attack or reaction of sodium fluosilicate with ammonia and the precipitation of the desired cryolite by the treatment of the solution of the fluorides resulting from said reaction with a solution of sodium aluminate.

That is, the process of this invention is based on the following reactions:

(1) $Na_2SiF_6 + 4NH_3 + 2H_2O \rightarrow 4NH_4F + 2NaF + SiO_2$ (2) $2NaF + 4NH_4F + NaAlO_2 \rightarrow Na_3AlF_6 + 4NH_3 + 2H_2O$ One object of this invention is that of providing an improved process that will yield a cryolite particularly suited for its chief use which is in the metallurgy of aluminum.

According to the most recent known processes for producing cryolite, fluosilicic acid is treated with ammonia until it reaches an alkaline pH so as to obtain a solution of ammonium fluoride, while the silica precipitates and separates. From this ammonium fluoride solution the cryolite is then obtained by adding a sodium salt and an aluminum salt, or sodium aluminate. Or else the fluosilicic acid is treated with sodium hydroxide, thus forming sodium fluosilicate which is subsequently decomposed by an excess of sodium hydroxide which will precipitate silica, thereby obtaining a sodium fluoride solution from which the cryolite will precipitate by the addition of sodium aluminate and by treatment with carbon dioxide (carbonation) in order to buffer the alkalinity due to the sodium hydrate which is set free during the precipitation of the cryolite.

These known industrial processes for the production of cryolite (and of fluorides) start from fluorine compounds (fluosilicic acid and sodium fluosilicate) which are obtained as by-products in processes for the treatment of phosphorites (for instance for the production of superphosphates).

In the first of the two above-cited known processes, that is, in the treatment of the fluosilicic acid with ammonia, there is the danger that the phosphorus and the other impurities (silica) present in the solution of the fluosilicic acid, will remain in the ammonium fluoride solution which is formed, and that they will then be included as impurities in the cryolite product. This drawback is quite serious because, as is well known, only very low contents of silica and, above all, of phosphorus, can be tolerated in the cryolite used in aluminum metallurgy. For example, even rather small quantities of phosphates present in the cryolite may cause short-circuit phenomena in the electrolytic cells operating with a cryolitic bath; from this point of view the tolerance for phosphates in the cryolite is very low, about 0.1% by weight.

If, on the contrary, and in order to reduce the chance of the occurence of such a drawback, one passes, following the second of the above-cited known processes, through sodium fluosilicate (as, when this salt is precipitated, it is possible to remove (eliminate) the impurities that remain in the mother-liquors), one then has to give up the double advantage of the ammonium process, namely, that of being able to work with very concentrated solutions (inasmuch as the ammonium fluoride is much more soluble than sodium fluoride), and that of not requiring the carbonation step during the precipitation phase of the producing of cryolite.

A further advantage of the present invention is that of providing a process of this general type which will combine the advantages of both the two known processes while at the same time eliminating their drawbacks.

Still another object of this invention is that of providing a process of the above-mentioned type wherein the operational conditions correspond to the best possible combination of the parameters one has to cope with.

As already mentioned, the process according to the present invention starts from sodium fluosilicate. The starting sodium fluosilicate is obtained by precipitating the same with sodium salts from fluosilicic acid. For obvious economical reasons, the preferred sodium source is sodium chloride:

(3)      $H_2SiF_6 + 2NaCl \rightarrow Na_2SiF_6 + 2HCl$

This is carried out by simply adding to the fluosilicic acid solution a solution of sodium chloride in excess (about 10%) of the stoichiometric. In this way, there were obtained yields greater than 90%.

The greatest part of the phosphorus present in the solution of fluosilicic acid remains in the mother-liquors. If one starts from fluosilicic acid obtained from the wash waters of the exhaust gases of the phosphorite-treating plants, one obtains in general a very pure sodium fluosilicate. However, one may also use the fluosilicic acid present in the diluted phosphoric acid, but in this case the sodium fluosilicate obtained is very impure and may contain, besides phosphates, all the impurities which normally accompany the phosphoric acid produced by attack with sulphuric acid upon the phosphorites.

Thus, according to what has been stated above, the process according to the present invention comprises essentially a reaction between sodium fluosilicate and diluted ammonia in excess, so as to form a solution of ammonium and sodium fluorides, followed by the separation of silica and the impurities, and thereafter the precipitation of cryolite from said solution, and it is mainly characterized by the fact that the precipitation of the cryolite is carried out in an incomplete way, preferably at the same temperature at which the reaction of decomposition of the sodium fluosilicate is conducted.

The process according to this invention will be now described more in detail hereafter, and with reference to the attached drawing representing a schematic flow diagram of the process.

According to this invention, the attack upon the sodium fluosilicate by ammonia is conducted with solutions of diluted $NH_3$ having in general a concentration of 20–30 g./l. of free $NH_3$. One may use the mother-liquors of the cryolite which, besides the cited quantity of free $NH_3$, may contain even up to 6 g./l. of fluorine in the form of sodium and ammonium fluorides, and other salts that may accumulate during the cycle (for instance, salts with $SO_4^{--}$ ion, $Cl^-$ ion, etc.). The attack by these solutions upon the sodium fluosilicate may be conducted in a discontinuous (intermittent) way or, preferably, in a continuous way. The temperature is kept between 35° and 80° C. At temperatures below 35° C., one obtains a silica which is difficult to filter or decant. At temperatures higher than 80° C., on the contrary, there occurs an excessive vapor pressure of the ammonia solution. Furthermore, too low temperatures may be somewhat inconvenient inasmuch as they are difficult to maintain. In fact, the decomposition reaction of the sodium fluosilicate with ammonia is exothermic (about 20 cal./mole). Best results are obtained in the temperature range betwen 50° and 70° C. The contact times of the decomposition reaction vary from 40 to 120 minutes.

In this way, one obtains a solution in which the fluorine concentration, after filtering off the silica, is between 30 and 38 g./l. and is greater for the solutions obtained at a higher temperature. Greater fluorine concentrations should be avoided because of the low solubility of the sodium fluoride.

When operating under these conditions it will be found that the ammonia, which is reacted with the sodium fluosilicate, will always be in excess with regard to the stoichiometry of the reaction conducted according to Equation 2 above. This excess is between 20% and 30% by weight of the stoichiometric quantity (and generally amounts to 25%). The pH of the solution, at the end of the decomposition, will be between 9 and 9.2 when the reaction temperature is 35° C. and between 7.9 and 8.1 when the decomposition takes place at 80° C., while it will assume intermediate values (8.3–8.5–8.9) at intermediate temperatures.

There is a pH-range in which the lowest solubility of the silica in the fluoride solution is reached; the conditions chosen for the attack upon the sodium fluosilicate are such as to remain within this range. These solutions have therefore contents in dissolved silica generally falling between 0.2 and 0.3 g./l. The separation of the silica precipitated from the solution of fluorides is rather fast. In just a few minutes it is possible to decant a slurry containing 10–15% by weight of solids from which, by filtering, or better by centrifuging and washing, the greatest part of the fluorides may be removed, obtaining a cake having 35% to 45% by weight of solids. In general one recovers 98% by weight of the fluorine of the sodium fluosilicate. If this latter, however, contains calcium sulphate (gypsum), greater losses of fluorine will occur because of the precipitation of calcium fluoride.

The washing of the silica cake is normally carried out with water. However, one may also use the mother-liquors of the cryolite.

The solution of fluorides obtained after separation of the precipitated silica may still contain (besides the already-mentioned small quantities of $SiO_2$) phosphates, sulphates, chlorides, etc., that is, all those impurities that may dissolve during the attack upon the sodium fluosilicate with $NH_3$.

In order to eliminate the phosphates and the silica, it is found convenient to treat the solution of fluorides with a ferric salt (for instance ferric chloride) soluble in water or in an aqueous solution of the corresponding acid, and in which the iron does not occur in the form of complexes difficult to separate from the ammonia; thus, for example, acidic iron fluoride but not iron citrate or iron tartrate.

In fact, it is known that at alkaline pH's iron is a good flocculant of $SiO_2$, and that ferric phosphate is practically insoluble. The utilization of ferric salts for this purification purpose is made possible by the characteristics of the solution of fluorides mentioned previously (pH, fluorine concentration, temperature). Under these conditions the iron cannot precipitate in the form of fluoride salts (ferric cryolite, ferric fluoride, etc.) inasmuch as the pH is already too high. On the contrary, the ferric phosphate is still stable since the medium is still not too alkaline and, therefore, the phosphates may be precipitated together with the ferric hydroxide and the silica. The time required by this treatment varies from 10 minutes to 45 minutes. The precipitate may be removed either by filtering or by decanting. The quantity of ferric salt to be added varies depending on the impurities in the solution of fluorides and on the degree of purity that one wishes to attain in the cryolite product; however, it should always be below 0.3 part by weight of Fe for every 100 parts by weight of F in solution, even in the case of solutions practically free of $P_2O_5$. In the proportioning of the Fe for solutions containing also phosphates, it will be necessary that the quantity by weight of Fe be at least five times the stoichiometric quantity by weight necessary to form ferric phosphate; preferably it should be ten (10) times and more.

For the precipitation of the desired cryolite, the solution of fluorides is treated with a solution of sodium meta-aluminate whereby the cryolite precipitates according to Reaction 2. This reaction may be carried out either in a continuous or discontinuous reactor. One may operate, and one preferably does operate, at the same temperature at which the decomposition of the sodium fluosilicate was conducted. The admixture of aluminate to the solution is made with stirring, proceeding in such a way that in the reactor there will always be present an excess of fluorides with respect to the aluminate. The pH of the solution at the end of the reaction varies from 9.2 to 10.6 and depends on the temperature and on the excess of free $NH_3$ in the solution of fluorides. When operating at the previously specified temperatures, that is, at temperatures between 35° and 80° C., the whole of the ammonia that is freed remains dissolved in the mother-liquors and may be recycled back with the latter into the decomposition reactor for the sodum fluosilicate. The solution of aluminate is prepared according to known methods, by dissolving aluminum hydroxide in a hot solution of NaOH. The quantity of sodium meta-aluminate solution added to the solution of fluorides is between 84% and 90% by weight of the quantity necessary according to the above-indicated Reaction 2.

Furhermore, one proceeds in such a way that in the cryolite reactor there will always be an excess of fluorides mith respect to the aluminate.

As a matter of fact, it has been observed that if one operates with such a deficiency of aluminate, only a part (30–60% by weight) of the silica and of the phosphate that are still in the solution of fluorides will precipitate along with cryolite; the remainder of these impurities remains in the mother-liquors.

If however, the fluorides are precipitated with a stoichiometric quantity or even with an excess of aluminate, an almost complete precipitation also of the silica and of the phosphates will occur. The silica remains more easily in solution as long as fluorides are present. Besides, the capacity of the fluorides to maintain the silica in solution may be exploited to remove the $SiO_2$ already precipitated along with cryolite. As far as the phosphates are concerned, it is known that these may precipitate along with cryolite, because insoluble aluminum phosphate is formed when to the solution of fluorides is added the sodium meta-aluminate solution. If, however, the cryolite is precipitated in the presence of an excess of fluoride ions, the aluminum that will form by decomposition of the sodium meta-aluminate is immediately transformed into a complex by the fluoride ions in order to yield $AlF_6^{---}$ ions which do not precipitate in presence of phosphates.

The precipitation of the cryolite requires from 30 to 60 minutes. The cryolite may be separated from the greater part of the mother-liquors by decanting, then it may be collected on filters or in a centrifuge, after which it may be washed with a little water and calcined according to conventional systems. The mother-liquors contain from 3 to 6 g./l. of F in the form of sodium fluoride and ammonium fluoride and from 20 to 30 g./l. of free $NH_3$, besides small quantities of impurities which have gradually accumulated during the cycle (for instance $SO_4^{--}$, $Cl^-$, etc.). A part of these mother-liquors is discharged in order to re-establish the water balance of the whole cycle and for avoiding a harmful accumulation of the impurities (e.g., soluble salts such as, for instance, chlorides) mentioned before. From the mother-liquors thus discharged, and after the addition of small quantities of lime-wash, the $NH_3$ is stripped by steam vapor. The remainder of the mother-liquors is recycled into the decomposition reactor for the sodium fluosilicate. The washing water may be used to wash the silica cake coming from said decomposition.

Summarizing, the process according to this invention as above-described, and as illustrated by the attached flow-sheet and by the following illustrative and non-limiting examples, displays the following advantages and characteristic aspects:

Continuous re-cycling of the ammonia which is freed at the precipitation stage of the cryolite for the attack upon sodium fluosilicate, wherefore it is not necessary to add fresh ammonia except the quantity required to make up for the occasional losses; always provided, of course, that all the ammonia shall be recovered from the products leaving the plant (wastes).

Possibility of operating always at the same temperature, from the attack upon the fluosilicate to the precipitation of the cryolite.

Separation of the silica in an easily filterable or decantable form.

Elimination of the silica and of the phosphorus through two separate operations or steps (treatment of the solution containing sodium fluorides and ammonia, after elimination of the silica, at a suitable pH, with an iron salt; and incomplete precipitation of the cryolite, whereby there remain in solution significant quantities of ammonium and sodium fluorides, which further purify the end product).

In the following examples, the parts and percentages, where not otherwise indicated, are to be understood as by weight.

EXAMPLE 1

Into a 2 liter flask fitted with a stirrer, a thermometer, a reflux condenser and four graduated feeding cylinders, the following products were fed simultaneously with constant stirring, while maintaining the temperature at 60° C. by external cooling:

(a) 0.6 liter of mother-liquors from a preceding preparation of cryolite, containing 3.3 g./l. of fluorine, 3 g./l. of $SO_4^{--}$, 0.024 g./l. of $P_2O_5$, 23 g./l. of free $NH_3$ and 0.016 g./l. of $SiO_2$.

(b) 0.4 liter of the solution obtained by washing with water the silica cake obtained in the preceding test for decomposition of sodium fluosilicate. This solution contains: $F=11.44$ g./l., $SiO_2=0.18$ g./l., $P_2O_5=0.02$ g./l., $NH_3=0.9$ g./l., $SO_4^{--}=1.2$ g./l.

(c) 0.130 liter of a solution of $NH_3$ at a concentration of 100 g./l.

(d) 60 grams of raw sodium fluosilicate obtained by precipitating with sodium carbonate the fluosilicic acid contained in the phosphoric acid prepared through the attack of phosphorites with sulphuric acid; this salt contains: $F=58.2\%$, $P_2O_5=0.18\%$, $CaSO_4=3.2\%$.

The time required for feeding the solid and the solutions into the reactor amounted to 20 minutes. Thereafter the suspension was stirred for a further 60 minutes. The pH of this suspension was 8.4. The whole was then centrifuged in order to separate the silica from the solution of the fluorides.

In this way there were obtained: 1.04 l. of a solution having the following composition: $F=34.3$ g./l., $SO_4^{--}=3$ g./l., $P_2O_5=0.083$ g./l.

The silica cake was then washed with water at 60° C. until 400 cc. of a solution were collected containing: $F=11.5$ g./l., $SiO_2=0.17$ g./l., $P_2O_5=0.018$ g./l., $SO_4^{--}=1.2$ g./l., free $NH_3=0.85$ g./l. This solution may be re-cycled back into the reaction flask for a subsequent decomposition of sodium fluosilicate.

To the 1.04 liters of solution containing 34.3 g./l. of fluorine were added over a period of 20 minutes, at a constant temperature of 60° C. and with stirring, 3.3 g. of $FeCl_3 \cdot 6H_2O$ dissolved in little water. After another 20 minutes, the ferric hydroxide precipitate was filtered out, and there was thus obtained 1.045 liters of solution containing 34 g./l. of fluorine, 0.032 g./l. of $P_2O_5$, 0.03 g./l. of $SiO_2$, 2.98 g./l. of $SO_4^{--}$. To this solution, kept at 60° C. with stirring, there was added over a period of 20 minutes, a solution containing 7.6 grams of aluminum in the form of $NaAlO_2$. The pH of the solution changes from 8.4 to 9.3. After 1 hour, the cryolite thus produced was collected on a filter, the cake was then washed with 60 cc. of $H_2O$ and dried at 110° C.; finally the whole was calcined at 650° C., thereby obtaining 59.2 grams of cryolite containing: $F=53\%$, $SiO_2=0.025\%$, $P_2O_5=0.016\%$, $SO_4^{--}=0.1\%$.

The mother-liquors of the cryolite (1.04 l.) showed the following composition: $F=3.45$ g./l., $SiO_2=0.016$ g./l., $SO_4^{--}=2.9$ g./l., free $NH_3=24.5$ g./l., $P_2O_5=0.022$ g./l. Part of these mother-liquors (0.6 l.) may be re-cycled to the decomposition flask containing fresh sodium fluosilicate, the rest being drained off and ammonia was recovered from it by adding limewater and stripping with steam.

EXAMPLE 2

Into a small continuous reactor fitted with a stirrer, valves for the inlet and outlet of fluids, and a thermostatically controlled heat-stabilizing system set at 35° C., were fed in 1 hour through a metering screw-feeder, 200 grams of raw undried sodium fluosilicate, obtained by precipitating with sodium carbonate the fluosilicic acid present in the dilute phosphoric acid and washing then the fluosilicate with hydrochloric acid of 6% concentration, in order to remove the greater part of the sulphates and phosphates that contaminate the fluosilicate. This salt has the following average composition: $F=51.5\%$, $$SO_4^{--}=0.45\%, P_2O_5=0.04\%$$

At the same time the following solutions were also introduced into the reactor at the indicated flow-rates:

3400 cc. of mother-liquors coming from the precipitation of the cryolite and containing: 5 g./l. of F−, 20.5 g./l. of free NH₃, 2.1 g./l. of SO₄−−, 0.0035 g./l. of P₂O₅, 0.02 g./l. of SiO₂; 400 cc. of a solution obtained by washing the silica cake with water in a centrifuge, and containing 12 g./l. of F− and 1.3 g./l. of free NH₃; cc. 40 of 20% NH₃ solution.

The average contact time of these compounds in the reactor amounted to 60 minutes. From the reactor was continuously withdrawn a slurry which was conveyed into a continuous decanter from the bottom of which there was extracted a thickened substance which was finally centrifuged.

From the decanter and from the centrifuge there flowed out in one hour a total of 3700 cc. of solution containing: F=32.3 g./l., SO₄−−=2.16 g./l., SiO₂=0.23 g./l., P₂O₅=0.018 g./l.

The pH of this solution measured at 35° C. was 9.1.

The silica cake was then washed with water in a centrifuge and the wash solution was introduced into the reactor. The cake was discharged from the centrifuge in an intermittent way and contained 35% of solid substance (residue from calcination at 700° C.).

The 3400 cc. of solution of fluorides was continuously sent into a reactor like the preceding one which was fed in 1 hour with 23 cc. of a solution of Fe, at a concentration of 12% in the form of ferric chloride. The average contact time of the solutions in the reactor amounted to 30 minutes.

The slurry, which was withdrawn continuously was filtered: in 1 hour, cc. 3690 of a solution were obtained, which contained: F− 32.1 g./l.; SiO₂ 0.04 g./l.; P₂O₅ 0.08 g./l. This solution was sent continuously in a third reactor, fed with 24 g./h. of aluminium in form of NaAlO₂ solution at 35% by weight. The temperature in the reactor was 35° C.; the contact time, 40 minutes. The slurry, continuously withdrawn from the reactor, was sent into a continuous decanter from the bottom of which there was extracted a cryolite slurry which was then centrifuged and washed with 300 cc. of water.

3400 cc. of the mother-liquors of the cryolite were recycled into the decomposition reactor of the sodium fluosilicate. The remaining is removed from the cycle along with the washing water of cryolite. The centrifuged cryolite contained 30% of moisture and was first dried at 110° C. and then calcined at 650° C.

After calcination there were obtained 186 g. of cryolite showing the following composition: F=53.6%, SiO₂=0.035%, P₂O₅=0.009%, SO₄−−=0.02%

EXAMPLE 3

Sodium fluosilicate was prepared from a solution of fluosilicic acid in a reaction flask. For this purpose, 470 cc. of a solution containing 305 g./l. of H₂SiF₆ and 0.562 g./l. of P₂O₅, were reacted with 640 cc. of a 20% solution of NaCl. The sodium chloride was in excess by 10% with respect to the stoichiometry of the reaction as calculated by Equation 3.

At once there formed a crystalline precipitate of Na₂SiF₆ which was removed from the mother-liquor by means of filtration and was then washed with just a little water. There was thus obtained 200 g. of moist salt containing 51.7% of F and 0.005% of P₂O₅. This salt was used for preparing cryolite according to the system described in the preceding example. For this purpose, the 200 grams of the salt were introduced through a metering-screw into the decomposition reactor for the sodium fluosilicate, over a period of 1 hour. The reactor was thermostatically set at 50° C. The reactor was contemporaneously fed also with the following solutions at the stated flow-rates per hour:

3400 cc. of mother-liquors coming from the precipitation of the cryolite and containing: 3.8 g./l. of F, 21.6 g./l. of free NH₃, 0.015 g./l. of SiO₂ and 0.0007 g./l. of P₂O₅, 200 cc. of a solution obtained by washing into the centrifuge the silica cake. This solution containing: 13 g./l. F−; 1.5 g./l. NH₃, 20 cc. of a solution of NH₃ at 20%.

The average contact time of these compounds in the reactor amounted to 40 minutes. The slurry was continuously extracted from the reactor as described in the preceding example.

After separation of the silica by decantation and centrifugation, there were obtained 3565 cc. of a solution containing: 31.82 g./l. of F−, 0.25 g./l. of SiO₂, 0.0025 g./l. of P₂O₅. The pH of this solution at 50° C. was 8.85.

The silica cake was washed with a little water in a centrifuge and the solution thus obtained was then introduced into the reactor. The silica cake discontinuously discharged from the centrifuge contained 43% of solid substance.

The solution having a content of 31.82 g./l. of F− was treated, in the same way as described in the preceding example, with 16 cc. of a 12% solution of Fe in the form of ferric chloride.

The average contact time of the solution in the reactor was 30 minutes: the temperature was 50° C.

After filtration of the precipitate, there remained 3550 cc. of a solution containing 31.7 g./l. of F−, 0.03 g./l. SiO₂, 0.0015 g./l. of P₂O₅. This solution was continuously sent into the precipitation-reaction stage of the cryolite, where it was reacted at a temperature of 50° C. with 23.6 g. of aluminum in the form of a NaAlO₂ solution having a concentration by weight of 35%. The average contact time of the solution in the reactor was 35 minutes. The slurry that was continously extracted from the reactor was treated as in the previous example. All of the mother-liquors flowing out of the centrifuge were re-cycled. From the cycle only the washing waters of the cryolite (about 300 cc.) were removed. The cryolite, after calcination at 650° C., weighed 186.2 g. and showed the following composition: F=53.7%, SiO₂=0.03%, P₂O₅=0.0018%.

What is claimed is:

1. A process for preparing cryolite starting from sodium fluosilicate comprising the steps of:
    (a) reacting, at temperatures between 35° C. and 80° C., sodium fluosilicate with a dilute aqueous solution of ammonia, said ammonia being in excess of 20–30% by weight of the stoichiometric quantities necessary to satisfy the equation:

Na₂SiF₆+4NH₄OH→2NaF+4NH₄F+SiO₂+2H₂O the final pH being between 7.9 and 9.2, thereby obtaining an aqueous solution of sodium and ammonium fluorides and a precipitate of silica;
    (b) separating the precipitated silica;
    (c) treating the solution of sodium and ammonium fluorides with a ferric salt in excess with respect to silica and phosphate ion still contained in the solution, and separating the precipitated impurities;
    (d) incompletely precipitating the cryolite obtained from the solution referred to in (c) by adding sodium meta-aluminate in an amount less than the stoichiometric quantity necessary to precipitate all the cryolite so that a substantial quantity of fluoride ion remains in the solution; and
    (e) recycling at least a part of the mother-liquor of the cryolite for reaction with sodium fluosilicate.

2. A process according to claim 1, wherein the decomposition of the sodium fluorisilicate by ammonia is carried out at a temperature of 50–70° C.

3. A process according to claim 1, wherein the decomposition of the sodium fluosilicate is carried out with an excess of 25% by weight of ammonia.

4. A process according to claim 1, wherein the pH of the solution at the end of the decomposition of the sodium fluosilicate is 9–9.2 when the temperature is 35° C.; 7.9–8.1 when the temperature is 80° C.; and an intermediate value when the temperature falls between 35° C. and 80° C.

5. A process according to claim 1, wherein the ferric salt is ferric chloride or acidic ferric fluoride.

6. A process according to claim 1, wherein the amount of sodium meta-aluminate used for the incomplete precipitation of the cryolite is between 84 and 90% by weight of the stoichiometric requirement for complete precipitation.

7. A process according to claim 1, wherein all the steps recited in claim 1 are carried out at substantially the same temperature.

References Cited
UNITED STATES PATENTS

| | | | |
|---|---|---|---|
| 2,916,352 | 12/1959 | Fitch et al. | 23—88 |
| 2,963,344 | 12/1960 | Tarbutton et al. | 23—88 |
| 3,056,650 | 10/1962 | Matoush | 23—88 |

EDWARD STERN, Primary Examiner

U.S. Cl. X.R.

23—182, 193

UNITED STATES PATENT OFFICE
CERTIFICATE OF CORRECTION

Patent No. 3,563,699          Dated February 16, 1971

Inventor(s) Giovanni Cuneo, Pietro Saccardo and Giuseppe Mu

It is certified that error appears in the above-identified pate and that said Letters Patent are hereby corrected as shown below:

Column 4, line 20, "separate from" should read -- be decomposed by -- ; column 4, line 40, "always" shou read -- never -- .

Signed and sealed this 25th day of July 1972.

(SEAL)
Attest:

EDWARD M. FLETCHER, JR.          ROBERT GOTTSCHALK
Attesting Officer                 Commissioner of Patents